S. O. TRUDELL.
Gas Regulator.
No. 107,127.
Patented Sept. 6, 1870.
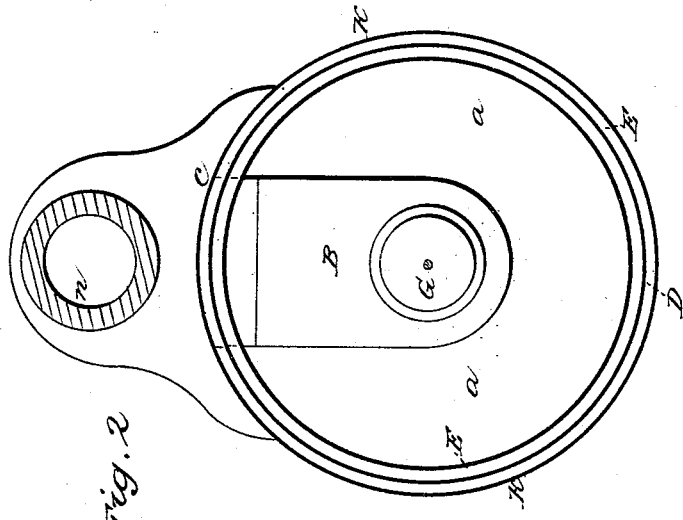
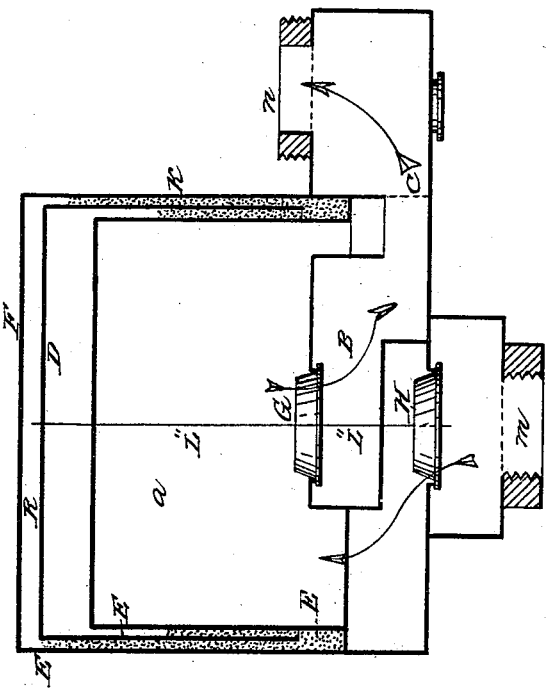
Witnesses:
Inventor:
Samuel O. Trudell

United States Patent Office.

SAMUEL O. TRUDELL, OF DETROIT, MICHIGAN.

Letters Patent No. 107,127, dated September 6, 1870.

AUTOMATIC GAS-REGULATOR.

The Schedule referred to in these Letters Patent and making part of the same

*To all whom it may concern:*

Be it known that I, SAMUEL O. TRUDELL, of Detroit, in the county of Wayne and State of Michigan, have invented a new and Improved Automatic Gas-Regulator; and I do hereby declare that the following is a full and clear description thereof, and that any one skilled in the art could make the same by referring to the accompanying drawings forming part of this specification.

Figure 1 represents a vertical central section of my improved automatic gas-regulator.

This invention has for its object, to provide for a more sensitive and efficient apparatus, whereby the supply of gas or other fluid will be automatically regulated in exact conformity with the demand for the same.

My invention consists chiefly in the inner chamber B and the self-counterbalanced valves G and H, used in combination with the float D, liquid-chamber E, inlet M, and outlet N.

The object of chamber B and valve G is to prevent the pressure in the chamber to which the outlet is connected from being subject to the same variations as the pressure which controls the float D and the main valve H. For if, as in other regulations, the outlet is immediately connected with the chamber in which the float is operated, the pressure at the outlet (and in the pipes) must necessarily be the same as in the chamber in which the float is operated, and as the float D and valve H are operated by an increased or diminished pressure in chamber A, consequently the pressure at the outlet and in the pipes increase and diminish in same proportion, therefore such regulators are not good regulators.

By refering to my diagrams you will notice that my improved chamber B and valve G answer the required end, valve G effectually regulaing the pressure between chamber A and the outlet N; moreover, the two valves G and H, as operated, effectually counterbalance one another.

In fig. 1—

K represents a vessel of cylindrical or other suitable form, with central aperture M, for the admittance of gas, and side apperture N, for the discharge of the same.

R is the air-chamber.

F is a movable lid or cover.

E is a circular water-chamber, in which operates float D.

A is the principle gas-chamber.

B is my improved chamber and outlet.

L is the rod connecting float D with valves G and H.

Having thus described my invention,

I claim as new and and desire to secure by Letters Patent—

1. Chamber B, provided with valve G and outlet C, and used in connection with chamber A and float D, essentially as set forth.

2. The counterbalanced valves G and H, used in connection with chambers A and B, essentially and for the purpose set forth.

Such are my claims and specification of my invention, signed by me this 30th day of May, 1870.

SAMUEL O. TRUDELL.

Witnesses:
 J. G. EUSTIS,
 A. F. ARMSTRONG.